United States Patent Office 2,787,078
Patented Apr. 2, 1957

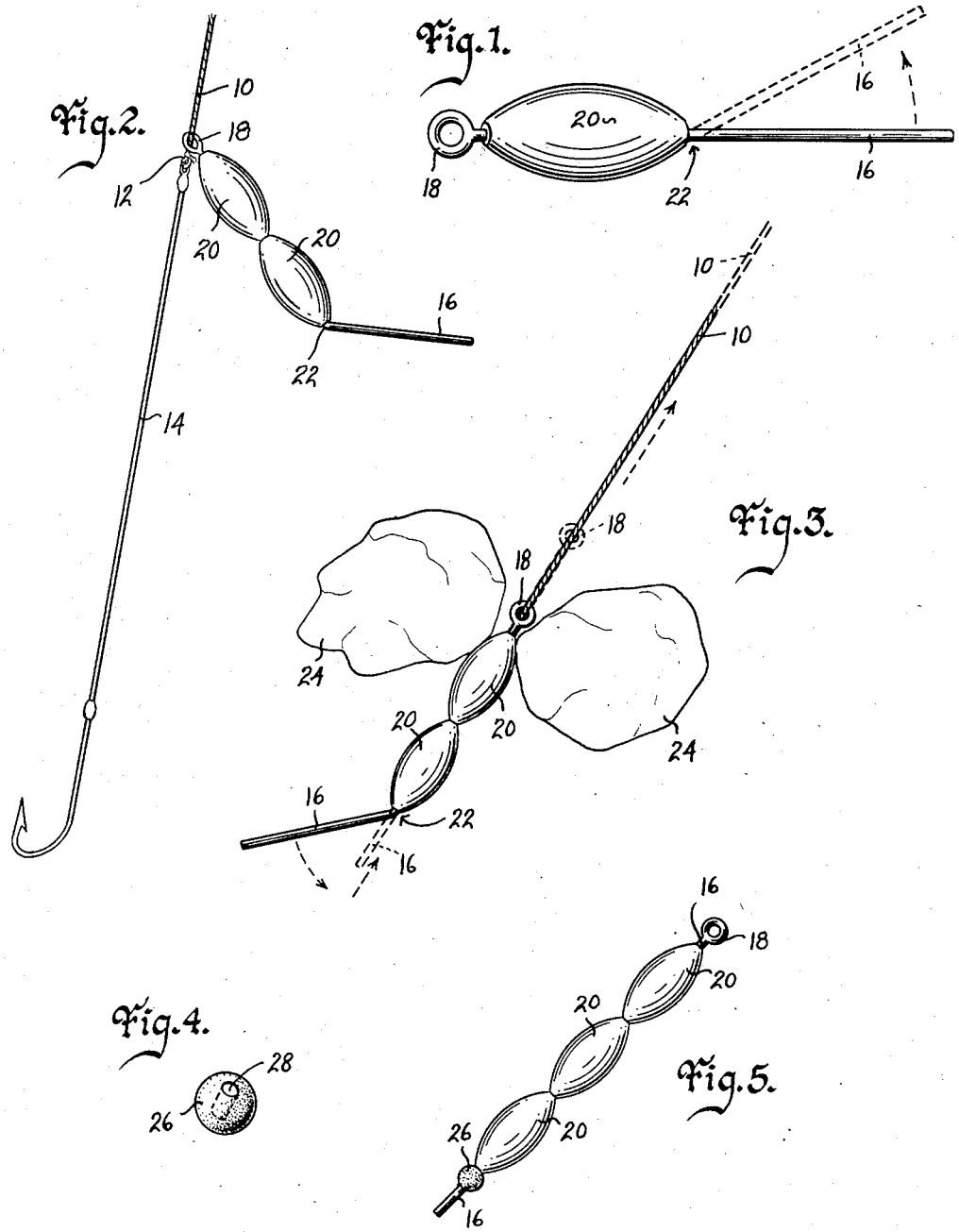

2,787,078

FISHING LINE SINKER

Marvin M. Aliber, Des Moines, Iowa

Application June 20, 1955, Serial No. 516,359

6 Claims. (Cl. 43—43.14)

My invention relates to improvements in sinkers for fishing lines and this application is a continuation-in-part of my co-pending application under the same title filed September 15, 1952, Serial No. 309,713, which has been abandoned.

In the sport of fishing, the use of a sinker on the fishing line plays an important part at various times and under varying circumstances. For example, a heavier sinker will be required for use in a fast moving stream than would be necessary if the current were slow, and to provide for this it has been customary to add or subtract from the line the number of sinkers used depending upon their respective weights. The selection of the number of sinkers necessary or the weight of sinkers required under the particular circumstances is of course a part of the sport that adds to the challenge of skill of the fisherman along with the selection and use of the myriads of lures available, the type of rod and line used and all the other paraphernalia with which the sportsman goes equipped.

In all the ramifications of the fishing sport it has been my observation that while a good deal of time, energy and money has been expended in developing lures, rods, lines, special wearing apparel and the like for the fisherman, the type and manner of use of sinkers has remained substantially the same. Probably the most widely used sinker today is the clamp-on type which consists of a weight means having a longitudinal surface groove in which the fishing line is placed and a bendable clamp means at each end of the groove which is bent to hold the sinker to the line. While this type sinker can be removed by unbending the clamps without removing the lure, a few such bendings cause the clamps to break off and the sinker is of course useless. Furthermore, such clamp-on sinkers have no slidability on the line and if caught in rocks, tend to cut the line when it is pulled in an attempt to free it. Also there is an oval and a ball shaped lead sinker that is provided with a transverse opening by which it is threaded onto the fishing line and has an advantage over the clamp-on type in being slidable on the line, but also has disadvantages in that the line must be knotted to keep the sinker on and obviously changing or removing sinkers resolves itself into several operations of untying and tying of knots especially since any lures attached to the line have to be removed also in this operation. Consequently with this latter type of sinker it can thus be appreciated that when a fisherman finds it desirable from time to time to increase, decrease or remove the sinker weight from his line, the task can be quite tedious and laborious, especially if the line is wet. Certain other type sinkers have attached eyes that are threaded or tied on the line, instead of the line running through the body of the sinker, but the problem of changing these is the same as above described.

Another problem from the use of the present type sinkers, mentioned just briefly above, which is important to the fisherman arises when sinkers are used to hold the bait deep in the stream in places where there may be rocks and the like.

It is well known that fish feed among rocks and consequently such places afford the best opportunities of getting a catch. In these situations it is an extremely frequent occurrence that the sinker becomes inextricably lodged in some crevice among submerged rocks or the like so that the only choice of the fisherman is to pull hard enough on the line to break it loose from the sinker, with the result that not only is the lure on the end of the line usually lost, but the strain on the line can seriously damage and weaken it though such effect may not be immediately apparent. And frequently with the clamp-on sinker the line is easily cut by the clamp by any pull on the line with the sinker lodged in rocks. The breaking or cutting of fishing lines and loss of lures in this fashion is frequent enough to cause considerable annoyance and aggravation to fishermen, and especially so when it happens on the first use of a new line. The loss of the sinkers is of no practical concern since they are very inexpensive and expendable, but the loss of lures and damage to lines, accompanied by loss of time in making necessary repairs and changes of lures leaves much to be desired.

Therefore, with these problems in mind it is one of the important objects of my invention to provide a sinker for fishing lines that can be easily and quickly attached to or removed from the same without tying or untying any knots in the line or without the necessity of detaching the lure from the line.

Another object of this invention is to provide means for increasing or decreasing the number of sinkers on any one fishing line without tying or untying knots in the line and without removing any lures thereon.

Still another object of my invention is to provide sinkers of the above class that can easily be removed when caught in rocks or the like without causing damage or injury to the line and without resulting in loss of any lure on the free end of the line.

A further object of my invention is to provide a novel means for attaching sinkers to fishing lines whereby the drag on the line from the sinkers is materially reduced so that the possibility that the fish taking the lure or bait will become aware that a line is connected thereto is also materially reduced.

A still further object inhering in this invention is the provision of novel releasable means for disengaging a fishing line from a sinker entrapped in the water, involving force applied to the line wherein the amount of force required to effect the release is less than that necessary to break or unduly strain the line.

Other objects of my invention include sinkers as characterized above that are extremely economical in manufacture and efficient for their intended purpose.

These and other objects will be apparent to those skilled in the art.

My invention consists in the construction, arrangement and combination of the various parts of the device, whereby the objects contemplated are attained as hereinafter more fully set forth, and specifically pointed out in my claims, and illustrated in the accompanying drawings, in which:

Fig. 1 is an enlarged elevational view of a single sinker illustrating this invention, Fig. 2 is a perspective view of a portion of a fishing line with hook attached and showing two sinkers arranged thereon by a preferred embodiment of my invention, Fig. 3 is a perspective view of the sinkers in Fig. 1 shown lodged between rocks and illustrating the manner of removing the sinkers from the line, Fig. 4 is a perspective view of a yieldable stop member for use in a modified arrangement of my sinker means, and Fig. 5 is a perspective view of my invention showing the use of three sinkers and embodying the stop member of Fig. 4.

Referring to the drawings I have used the numeral 10 to designate a fishing line that may be attached at one end to any suitable pole, rod and reel or the like which is not shown, and is secured at its other end by means of a knot 12 to a hook 14 or suitable lure. An elongated lightweight bendable sinker supporting rod member 16 preferably made of wire or the like has an eye 18 on one end and is slidably mounted by means of the eye 18 on the line 10 as shown in Fig. 2. A suitable weight or sinker 20 is used with rod 16 and this may be the common oval or football shaped lead sinker illustrated and which is economical to manufacture and adequate for its intended purpose. This sinker is provided with a longitudinal bore as is well known and is merely threaded onto the rod 16 as shown in Fig. 1. Eye 18 will serve as a stop means in one direction and by bending the free end portion of rod 16 (Fig. 1) the bend point 22 serves as a yieldable stop means against movement of the sinker 20 in the other direction. It will be understood that the length of rod 16 may be such to accommodate one or more sinkers and for purposes of illustration I have shown the use of three sinkers in Fig. 5 although it is not intended to limit the use of this invention to any specific number of sinkers.

In using this sinker means, the eye 18 on rod 16 is initially threaded onto the line 10 in the same fashion as the sinker itself is now done in the present state of the art except that in this invention, line 10 is freely slidable through eye 18 whereas in the more or less accepted practice of mounting sinkers they are immovable on the line and move with the line. The sinker 20 is then placed on rod 16 as described and a slight bend in the free end of the rod is made as illustrated. It will be understood that rod 16 is made from some easily bendable material that is strong enough to hold its bent position against the weight of one or several sinkers. However, it should be flexible enough so that a slight pressure on the sinkers toward the free end of rod 16 will cause the bend point 22 to straighten out and allow the sinkers to come free. In this respect it is pointed out that the rod 16 when bent as described is susceptible of being straightened out by the application of a much lesser force than that required to break or unduly strain the line 10. Consequently, if the sinkers are lodged in rocks 24 as illustrated in Fig. 3, a slight tug on the line will cause the rod 16 to straighten out so that the sinkers will slide off without breaking or straining the line and the line and lure can be retrieved without any damage or loss other than loss of the sinkers which are expendable. It will also be appreciated that in addition to the advantage of saving a line and lure from a snared sinker position, a fisherman can quickly and easily increase or decrease the number of sinkers on his line or remove them entirely by the manner hereinabove described.

With reference to Figs. 4 and 5, I have illustrated the use of a yieldable stop member or ball 26 that is provided with a transverse opening 28 by means of which this ball is merely frictionally threaded onto rod 16 the same as the sinkers. The size of opening 28 should be small enough to prevent ball 26 from sliding on rod 16 under its own weight or from contact with the sinkers, but yieldable to pressure such as suggested in Fig. 3 or by an intentional manual application as described so that the sinkers can be removed. Use of this ball 26 serves the same function as the bending of rod 16 although both means can of course be used together as well as separately and it will be understood that the frictional contact of ball 26 with rod 16 is such that it will yield and slide off rod 16 under a much lesser force than that required to break or strain line 10.

Aside from the advantages in attaching and removing sinkers and in preventing damage and loss to line and lure, I wish to point out that this invention increases the possibility of catching fish. The reason for this resides in the fact that eye 18 is made large enough to be easily slidable on the line 10 or to have the line easily movable through it when rod 16 is carrying one or more sinkers and rests on the bottom of a body of water. As the bait or lure is taken by a fish there will be a tendency for the line to be pulled somewhat and obviously, the more resistance to the pull, the more apt is the fish to become aware of the trap. With sinkers immovable on the line as is presently done, it will be apparent that the weight thereon will cause a considerable drag and offer a relatively large amount of resistance to a tug on the bait. However, with my means for mounting sinkers, it will be appreciated that only eye 18 is on the line while the sinkers will be resting on the bottom. Consequently since the line is freely movable through eye 18, it will be seen that the sinkers offer practically no resistance to any movements of the line as would be occasioned by a fish taking the bait. The resulting effect for a fisherman sensitive to the action of his line is that he can land many fish that would otherwise have gotten away.

It is submitted that the invention shown and described is aptly suited to achieve the purposes intended and is characterized by a combination of highly useful and mutually cooperating elements that combine their respective and proportionate functions in accomplishing the objects sought to be obtained.

Some changes may be made in the construction and arrangement of my fishing line sinker without departing from the real spirit and purpose of my invention, and it is my intention to cover by my claims, any modified forms of structure or use of mechanical equivalents which may be reasonably included within their scope.

I claim:

1. The combination of a rod having an eye at one end thereof and a single bend at the opposite end thereof, said rod having only a single shank between the eye and the bend, sinker means slidably mounted on the shank, said eye, shank and bend being the only means for retaining the sinker means in association therewith, said rod being a material whereby the end portion thereof defining the bend will assume an axially aligned position relative to the shank when an excessive force is applied to the eye, said force being of much lesser degree than that required to break or unduly strain the fishing line.

2. A sinker for a fishing line, comprising, a single rod length having an eye at one end and a single bend at the opposite end, said eye designed for slidable engagement with a fishing line, sinker means slidably mounted on said rod intermediate said eye and said bend, said eye and said bend being the only means for limiting the movement of said sinker means on said rod, said rod being of a material whereby the end defining the bend will assume an axially aligned position therewith under the application of force to said eye, and said force being of much lesser degree than that required to break or unduly strain the fishing line.

3. The combination of a single rod length having an eye at one end and a single bend at the opposite end, sinker means slidably mounted on said rod intermediate said eye and said bend, said eye and said bend being the only means for limiting the movement of said sinker means on said rod, and said rod being of a material whereby the end defining the bend will assume an axially aligned position therewith under the application of force to said eye.

4. The combination of a rod having an eye at one end thereof and a single bend at the opposite end thereof, said eye designed for slidable engagement with a fishing line, said rod having only a single shank between the eye and the bend, sinker means slidably mounted on the shank, said eye, shank and bend being the only means for retaining the sinker means in association therewith, said rod being of a material whereby the end portion thereof defining the bend will assume an axially aligned position relative to the shank when an excessive force is applied to the eye, and said force being of much lesser degree than that required to break or unduly strain the fishing line.

5. The combination of a single rod length having a bend at one end and attaching means at the opposite end for mounting on a fishing line, a sinker slidably mounted on said rod intermediate said bend and attaching means, said bend and attaching means being the only means limiting the movement of said sinker on said rod, and said rod being of a material whereby the end defining the bend will assume an axially aligned position therewith under the application of force to said eye.

6. A device as defined in claim 5 wherein the amount of force required to align the ends of said rod is of a lesser degree than that required to break or unduly strain the fishing line.

References Cited in the file of this patent

UNITED STATES PATENTS

| | | |
|---|---|---|
| 1,564,147 | Stickley et al. | Dec. 1, 1925 |
| 2,271,899 | Miller | Feb. 3, 1942 |
| 2,501,471 | Larson | Mar. 21, 1950 |
| 2,589,715 | Lysikowski | Mar. 18, 1952 |
| 2,651,135 | Greenleaf | Sept. 8, 1953 |

FOREIGN PATENTS

| | | |
|---|---|---|
| 959,600 | France | Oct. 3, 1949 |